(12) United States Patent
Yu et al.

(10) Patent No.: US 7,551,162 B2
(45) Date of Patent: Jun. 23, 2009

(54) METHOD FOR KEYPAD OPTIMIZATION

(76) Inventors: Chang-Sung Yu, 4627 172nd Ave. SE., Bellevue, WA (US) 98006; Shih-Jong J. Lee, 15418 SE. 53rd Pl., Bellevue, WA (US) 98006

( * ) Notice: Subject to any disclaimer, the term of this patent is extended or adjusted under 35 U.S.C. 154(b) by 841 days.

(21) Appl. No.: 11/175,952

(22) Filed: Jul. 5, 2005

(65) Prior Publication Data
US 2007/0008288 A1    Jan. 11, 2007

(51) Int. Cl.
*G09G 5/00* (2006.01)
(52) U.S. Cl. ........................... 345/168; 345/171
(58) Field of Classification Search .......... 345/156–173, 345/179; 341/22, 28; 379/368; 400/109, 400/110, 489; 455/566
See application file for complete search history.

(56) References Cited

U.S. PATENT DOCUMENTS

| | | | |
|---|---|---|---|
| 6,005,495 A | 12/1999 | Connolly et al. | |
| 6,011,554 A | 1/2000 | King et al. | |
| 6,219,731 B1 | 4/2001 | Gutowitz | |
| 6,822,585 B1* | 11/2004 | Ni et al. | 341/28 |
| 6,847,311 B2* | 1/2005 | Li | 341/28 |
| 7,075,520 B2* | 7/2006 | Williams | 345/169 |
| 7,420,543 B2* | 9/2008 | Jayachandra | 345/171 |
| 2006/0139315 A1* | 6/2006 | Kim | 345/156 |
| 2006/0279433 A1* | 12/2006 | Cui et al. | 341/22 |

OTHER PUBLICATIONS

M. D. Dunlop. "Watch-Top Text-Entry: Can Phone-Style Predictive Text-Entry Work With Only 5 Buttons?." Proceedings of MobileHCI 04. Sep. 2004.

Kober, Skepner, Jones, Gutowitz, MacKenzie "Linguistically Optimized Text Entry on a Mobile Phone",Conference on Human Factors in Computing Systems, 2001.
"A Survey of Alternate Text-Entry Methods", 2000 Eatoni Ergonomics, Inc., www.eatoni.com (2000).
MacKenzie, Kober, Smith, Jones, Skepner. LetterWise: Prefix-based disambiguation for mobile text input. Proc. ACM Symp.UIST 2001, pp. 111-120. New York: ACM.

* cited by examiner

*Primary Examiner*—Nitin Patel

(57) ABSTRACT

A keypad optimization method for handheld devices with optimal multi-language entry capability and handiness for both handheld and fingertip manipulation receives application requirements containing language specification and performs application mapping using the application requirements to generate versatile keypad map output. A versatile keypad is implemented using versatile keypad map wherein the versatile keypad receives user input and generates received data output. An interactive optimization is performed using the received data having online action output. The online action is used to generate keypad output and screen display by the versatile keypad.

An application mapping method receives application requirements containing language specification and performs language entry order grouping using the language specification to generate entry order groups and valid combination output. An inter-group mapping is performed using the application requirements and the entry order groups and valid combination having mapping sets output. An intra-group location mapping is performed using the application requirements and the mapping sets having key maps output.

A versatile keypad interactive optimization method initializes the state value to initial input state and receives user key strike input. It performs interactive optimization using the user key strike and the state value having state update and symbol output.

9 Claims, 12 Drawing Sheets

|  | Groups |  | Symbol count |
|---|---|---|---|
| 37 letters: | [1a] ㄅㄆㄇㄈ ㄉㄊㄋㄌ | ㄍㄎㄏ ㄐㄑㄒ | (14) |
|  | [1b] ㄓㄔㄕㄖ ㄗㄘㄙ |  | (7) |
|  | [2] ㄧㄨㄩ |  | (3) |
|  | [3] ㄚㄛㄜㄝ ㄞㄟㄠㄡ | ㄢㄣㄤㄥㄦ | (13) |
| 5 tones: | [4] ˉ ˊ ˇ ˋ ˙ |  | (5) |

Figure 3

Chinese Phonetic-entry-sequence:

| PES group ID | Phonetic symbols/tones | Chinese Letters |
|---|---|---|
| [ 3]-[4] | ㄡˋ | → 歐 毆 ... |
| [1-2 1]-[4] | ㄌㄧˊ | → 利 立 ... |
| [ 2-3]-[4] | ㄧㄡˋ | → 又 右 ... |
| [1-2-3]-[4] | ㄌㄧㄡˋ | → 六 蹓 ... |

Figure 5

METHOD FOR KEYPAD OPTIMIZATION

TECHNICAL FIELD

This invention relates to the optimal multi-language entry capability for handheld devices to achieve both versatile language support and small and compact for handy carry and storage.

BACKGROUND OF THE INVENTION

While handheld devices such as cell phones, Personal Digital Assistant (PDA) etc. become indispensable in daily life, the capability to support multi-language entry is lagged behind. English and Chinese are the two most commonly used languages in the world. Yet convenient entries for English and Chinese letters are essential yet unmet needs in hand held devices.

The handheld devices have to be carried around so the devices must be as compact as possible. Therefore their keypads must be small and light weighed to fit the device. On the other hand, their key buttons must be as big as possible for easy fingertip manipulation. As the size of the handheld devices and keypad real-estate continues to shrink, it is difficult to support a large number of keys. On the other hand, the demands for numerical plus multi-language entry are increasing due to globalization and closer social-economical ties between different countries and regions with different languages.

There is a pressing need for keypad optimization to achieve not only versatile language support but also small and compact for handy carry and storage. An optimally designed handheld device must be (1) allows Multilanguage letters to key-button mapping for efficient multi-language entry, (2) small enough for hand carry and, (3) big enough key-button for finger tips to conveniently and precisely type the keys and optimally shaped to fit the stylish design.

Prior art approaches map multiple letters to one key and require users to type multiple strikes to enter the desired letter. There are two primary types of keypads for handheld devices: (1) number-pad and (2) qwaz-pad.

A. Number-Pad:

A popular number-pad is the phone pad which is widely used on telephone sets. To hold the 10 digits (0, 1, 2 ... 9) for phone number dialing, the traditional phone pad is a 10-button keypad. A variation of number-pad is the number pad, which can be seen in calculator or on the right side of computer keyboards for number entry.

To support the English language entry based on the number-pad, the 26 English letters are grouped and 3-to-1 mapped to the key buttons. This type of keypad is commonly used in cell phone applications. The drawback of the 10-key keypads for English entry is that one may need up to three strikes to enter a single English letter.

The Chinese language has 42 phonetic letters, more than the number of letters in English. To support Chinese language entry, traditionally, the 42 phonetic letters are grouped and then mapped to the 10-key buttons in cell phone applications. An example of such Chinese phonetic to key button mapping is a "4-to-1" mapping. In this case, one may need up to around 4 strikes to enter each phonetic letter, which is even worse than that in English language entry, B. Qwaz-Pad and Squeezed Qwaz-Pad:

The traditional qwaz-pads are derived from the traditional PC/terminal keyboards. The qwaz-pad has 3 rows of 10-column buttons to hold the 26 English letters for data entry.

While most cell phones use 10-key handy keypads, some high-end smart phones use qwaz-pad for English language entry. For handheld device language entry, the qwaz-pad has a fatal drawback due to its 10-column width: (1) The qwaz-pads' 10-column width is too wide, and therefore is difficult for a single-hand manipulation to simultaneously hold and hit keys with finger tip, especially comparing with the 3-column number-pads. (2)

The 10-column width is too wide, makes handheld device "fat" in shape, and is therefore very difficult to meet the stylish design needs in the marketplace.

To overcome the 10 column drawback, the qwaz-pad keypad can be squeezed into a squeezed keypad with only 14 keys and a 2-to-1 letters-to-button mapping. The squeezed qwaz-pad can better meet the stylish design requirement. However, one might need up to 2 strikes to enter a single English letter with the squeezed qwaz-pad for English letter entry.

As cell phones and electronic handheld devices become more and more popular in the modern life, each device needs to have not only a handy keypad, but also the capability of supporting universal (e.g., Chinese, Japanese, etc.) character data input. The existing 10-key number-pad, 26-key qwaz-pad and squeezed qwaz-pad designs have the following problems:

1. The 10-key number-pad has far fewer than the number of 26 English letters and 42 Chinese phonetic letters, which requires many to one mapping and makes number-pad difficult for language entry.
2. The 26-key qwaz-pad has 10 columns on each row.
   i. If regular size button is used, the keypad exceeds reasonable device width, and hence very "fat", not convenient to carry, and difficult for a single hand to simultaneously hold and type.
   ii. When forced to shrink the 10-column key buttons to fit in a single hand handy handheld device, the buttons are too small for finger tips to type.
   iii. When the 10-column buttons are squeezed into 14-key buttons, each button is assigned two letters, which makes double strikes needed and brings down language letter entry efficiency.
3. Chinese language needs 42 phonetic symbols for data input. Both the traditional number-pads and qwaz-pads with existing letter allocations are very difficult for Chinese language entry.

Other prior art methods are described in M. D. Dunlop. "Watch-Top Text-Entry: Can Phone-Style Predictive Text-Entry Work With Only 5 Buttons?." *Proceedings of Mobile-HCI* 04. September 2004., Hedy Kober 1 , Eugene Skepner 1, Terry Jones 1, Howard Gutowitz 1,2, and Scott MacKenzie "Linguistically Optimized Text Entry on a Mobile Phone", Conference on Human Factors in Computing Systems, 2001, MacKenzie, I. S., Kober, H., Smith, D., Jones, T., Skepner, E. (2001). LetterWise: Prefix-based disambiguation for mobile text input. Proceedings of the ACM Symposium on User Interface Software and Technology—UIST 2001, pp. 111-120. New York: ACM, Connolly, et al. U.S. Pat. No. 6,005, 495, Method and system for intelligent text entry on a numeric keypad, Dec. 21, 1999; King, et al., U.S. Pat. No. 6,011,554, Reduced keyboard disambiguating system, Jan. 4, 2000; Gutowitz, H. U.S. Pat. No. 6,219,731, Method and apparatus for improved multi-tap text input. Eatoni Ergonomics, Inc. Apr. 17, 200; and a survey is conducted in "A Survey of Alternate Text-Entry Methods", 2000 Eatoni Ergonomics, Inc., www.eatoni.com (2000). Unfortunately, none of the prior methods are suitable for multi-language entry, especially involving Chinese and English.

OBJECTS AND ADVANTAGES

This invention is a method to derive Optimized Versatile Handy (OVH) Keypad for handheld devices with optimal multi-language entry capability and handiness for both handheld and finger tip manipulation. It performs application mapping based on the application requirements to generate versatile keypad map. The versatile keypad mapping can be used to create versatile keypad map either by pre-manufactured hard keys or by soft keys or a combination of hard and soft keys. The versatile keypad can be optimized during the online operation (not just offline design stage) through a keypad interactive optimization method.

The primary objective of the invention is to provide optimal multi-language entry capability for handheld devices to achieve both versatile language support and small and compact for handy carry and storage. The second objective of the invention is to provide optimal fingertip manipulation and stylish design. The third objective of the invention is to provide a flexible data entry optimization for either collision-free or least-collision mappings. The fourth objective of the invention is to provide optimized entry during the online operation not just offline design stage. A fifth objective of the invention is to provide highly efficient data entry for both English and Chinese languages. A sixth objective of the invention is to allow optimized soft keypad data entry.

SUMMARY OF THE INVENTION

A keypad optimization method for handheld devices with optimal multi-language entry capability and handiness for both handheld and fingertip manipulation receives application requirements containing language specification and performs application mapping using the application requirements to generate versatile keypad map output. A versatile keypad is implemented using versatile keypad map wherein the versatile keypad receives user input and generates received data output. An interactive optimization is performed using the received data having online action output. The online action is used to generate keypad output and screen display by the versatile keypad.

An application mapping method receives application requirements containing language specification and performs language entry order grouping using the language specification to generate entry order groups and valid combination output. An inter-group mapping is performed using the application requirements and the entry order groups and valid combination having mapping sets output. An intra-group location mapping is performed using the application requirements and the mapping sets having key maps output.

A versatile keypad interactive optimization method initializes the state value to initial input state and receives user key strike input. It performs interactive optimization using the user key strike and the state value having state update and symbol output.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which:

FIG. 3 shows the grouping of 37 Chinese phonetic symbols and 5 tones;

FIG. 5 shows examples of the Chinese character increasing group entry order property;

DETAILED DESCRIPTION OF THE INVENTION

I. Application Scenario

Figure 1:
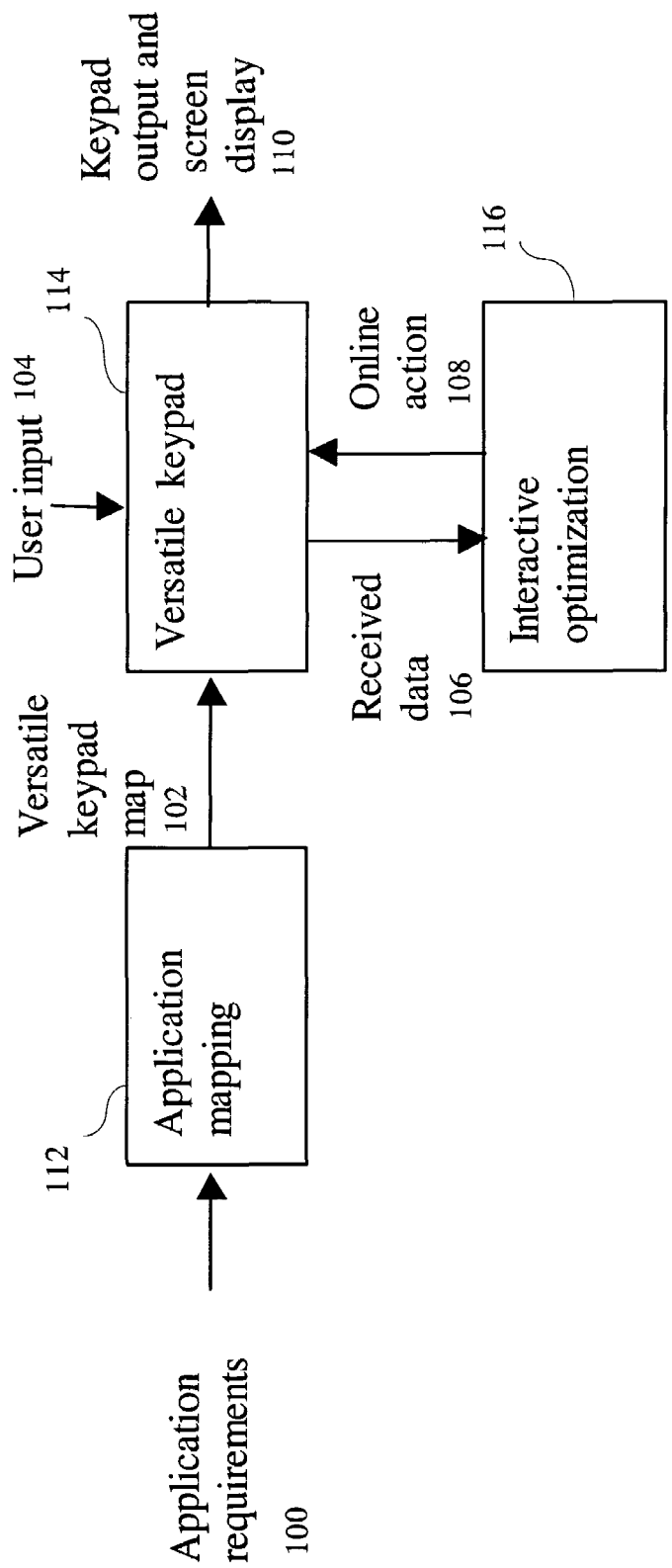
FIG. 1 shows the processing flow for the keypad optimization method application scenario.

The processing flow for the application scenario of the keypad optimization method is shown in FIG. 1. Application requirements 100 containing language specification 200 are entered to an application mapping module 112 that generates versatile keypad map 102 according to the application requirements 100. The versatile keypad map 102 is implemented in a versatile keypad 114 either by pre-manufactured hard keys or by soft keys or a combination of hard and soft keys. Soft Keys are multi-function keys that use part of the display to identify their function at any moment. The versatile keypad 114 receives a user input 104 and then generates received data 106 output. The received data 106 is processed by an interactive optimization module 116 that generates an online action output 108 to the versatile keypad 114 for keypad output and screen display 110.

II. Application Mapping

The application mapping method optimally maps the keypad configuration based on the application requirements. Examples for application requirements include:

Language entry support requirement: this determines the language requirement.

Physical keypad space requirement: this determines whether a collision-free Keypad design is possible or a least-collision keypad design should be performed.

Figure 2:
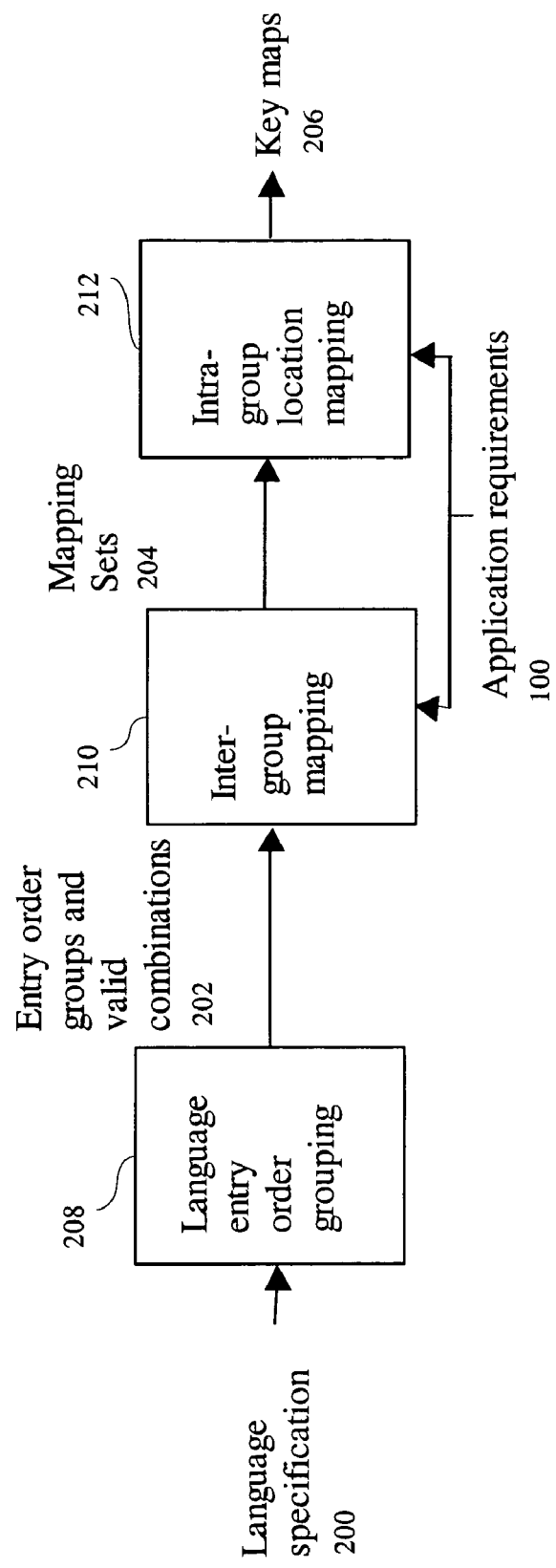
FIG. 2 shows the processing flow for the application mapping method.

Letters-to-key mapping requirement: determine optimal letters-to-key mapping for best finger tip manipulation Button size requirement: big enough button size for easy fingertip typing The processing flow of the application mapping method is shown in FIG. 2. Given a language specification 200, a language entry order grouping step 208 is performed. This results in entry order groups and valid combination 202 for the language. The entry order groups and valid combination 202 along with the application requirements 100 are used by an inter-group mapping module 210 to generate mapping sets 204. The mapping sets 204 and application requirements are processed by an intra-group location mapping module 212 to generate key maps 206.

II.1 Language Entry Order Grouping

The language entry order grouping method of the invention performs grouping of entry symbols (letters) according to the order of their entry in the language. It also determines the valid combinations of the groups. This grouping is language dependent but the principle for the grouping of the early entry symbols first is the same. The early entry symbol first method determines the symbol entry order and groups symbols according to the order.

In one embodiment of the invention, the Chinese language entry mapping is disclosed herein.

Each Chinese letter can be pronounced according to Chinese Phonetic Entry Sequence (PES) based upon phonetic symbols and tones. Chinese language has 37 Phonetic Symbols and 5 tones. These symbols can be partitioned into four groups according to the entry order as shown in FIG. 3. Note that group 1 is further partitioned into groups 1a and 1b.

Figure 4:
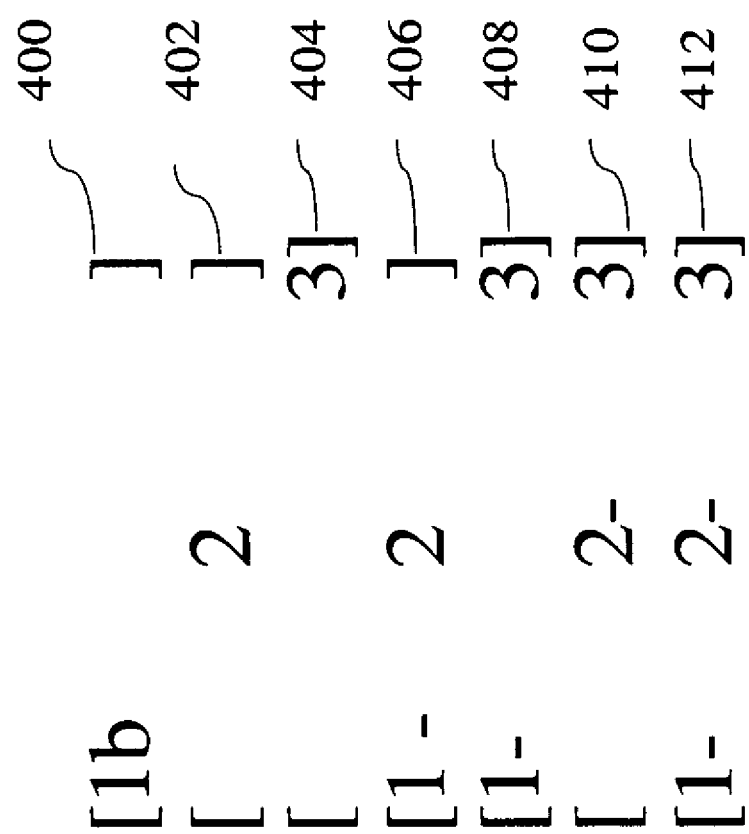
FIG. 4 shows the valid combinations of Chinese phonetic symbols.

Each Chinese pronunciation consists of at least one and at most three phonetic symbols. In Chinese PES, not all combinations are valid, and the valid PES sequences are shown in FIG. 4. FIG. 4 shows the sequence by group Ids including 1b only (400), 2 only (402), 3 only (404), 1 followed by 2 (406), 1 followed by 3 (408), 2 followed by 3 (410), and 1 followed by 2 followed by 3 (412).

The phonetic symbols must be followed by a tone in group 4. Therefore, it requires at most 4 strikes to enter a Chinese pronunciation.

After the language entry order grouping, the PES sequence is in the increasing order of the group Ids. Examples of the Chinese Phonetic entry order property is shown in FIG. 5. There are four examples of different group sequence combinations as shown in FIG. 5, II.2 Inter-Group Mapping Given the language entry order groups and the valid combinations, the inter-group mapping method determines the minimum button count required and performs keypad sets mapping by groups. Each button of the keypads is assigned multiple symbols, one from each set. There are two mapping methods: collision-free mapping and least-collision mapping. In the collision-free mapping, the minimum button count is determined by the language property. In the least-collision mapping, the minimum button count is given by the application requirements.

A. Collision-Free Mapping

To perform collision-free mapping, the least number of keys required for collision-free keypads is determined. To determine the least number, it first identifies dependent groups. A symbol in a dependent group cannot complete a letter by itself. The dependent groups can be used to find their disjoint groups that can be implicitly distinguish from dependent groups by the number of strikes. In the Chinese language embodiment of the invention, the group 1a is a dependent group since it cannot alone form a letter (see FIG. 4). That is, a group 1a symbol must always be followed by symbols from groups 2 or group 3. Group 3 can be identified as a disjoint group for group 1a. That is when one strike plus a tone is entered for a letter, it cannot be from group 1a and it implies group 3. Therefore, the symbols from group 1a and group 3 could co-exist in a button yet it takes only one strike to enter either symbols. Taking advantage of the disjoint groups, the possible strikes 1 and 2 have 24 possible elements (14 from group 1a or group 3, 7 from group 1b and 3 from group 2); the possible strikes 2 and 3 have 16 elements (3 from group 2 and 13 from group 3) but the 3 from group 2 are already included in the first 24 elements, and lastly, the ending strikes include the 5 possible tones from group 4. Therefore, Chinese PES sequences needs at most 24 possible buttons in each strike. A keypad with 24 buttons could be mapped with two sets. The first set contains the 24 elements of group 1a, group 1b and group 2 and the second set contains 18 elements of group 3 and the group 4.

Figure 6:
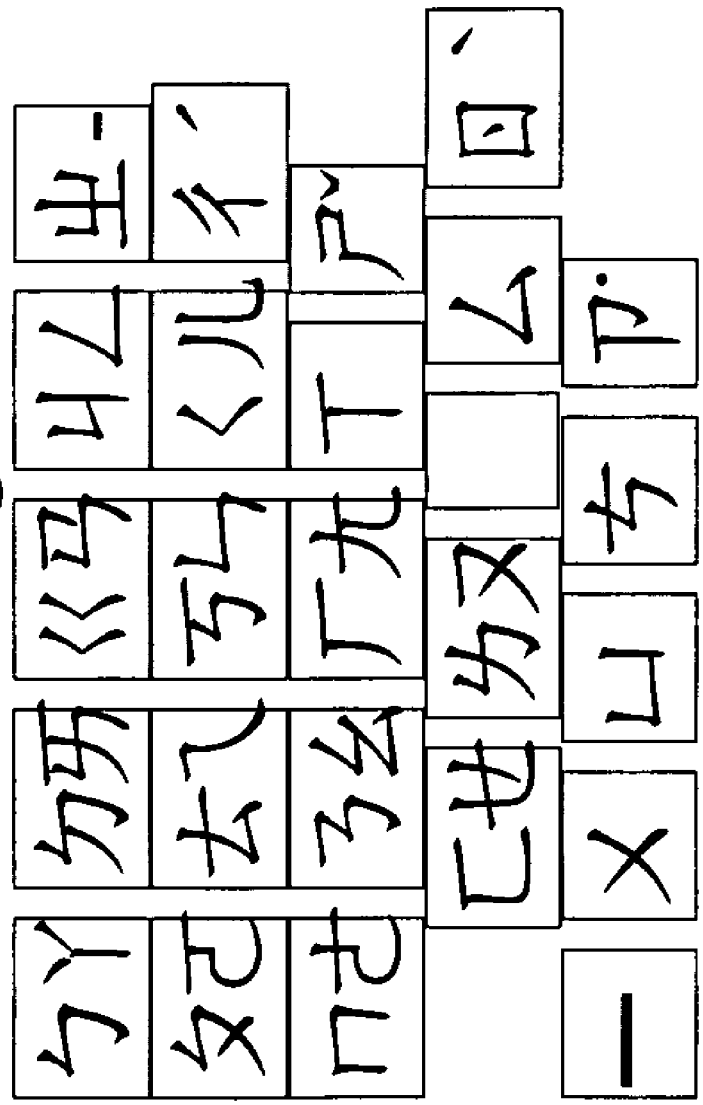
FIG. 6 shows an example of 5×5 keypad layout.

In one embodiment of the invention, the 5×5 keypad layout shown in FIG. 6 is a possible mapping since 5×5=25 which is greater than 24.

B. Least-Collision Mapping

When physical keypad space is limited, there may not be enough space to implement the buttons required by collision free mapping. In such case, the number of buttons available is less than the number of minimum collision-free keys. This will result in entry collisions. The least-collision mapping attempts to maps letters to key buttons with least entry collision.

To perform least-collision mapping, the language use frequency is determined. Let n be the total number of letters, and Let m (where m<n) be the number of buttons available for key buttons design. In one embodiment of the invention, the letters are ordered in the usage sequence, the top ranked m letters are chosen as the first set and the remaining letters are selected as the second set (if 2m>=n>m) or select the next ranked m letters (if 3m>=n>2m) and continue the process.

II.3 Intra-Group Location Mapping

Figure 7:
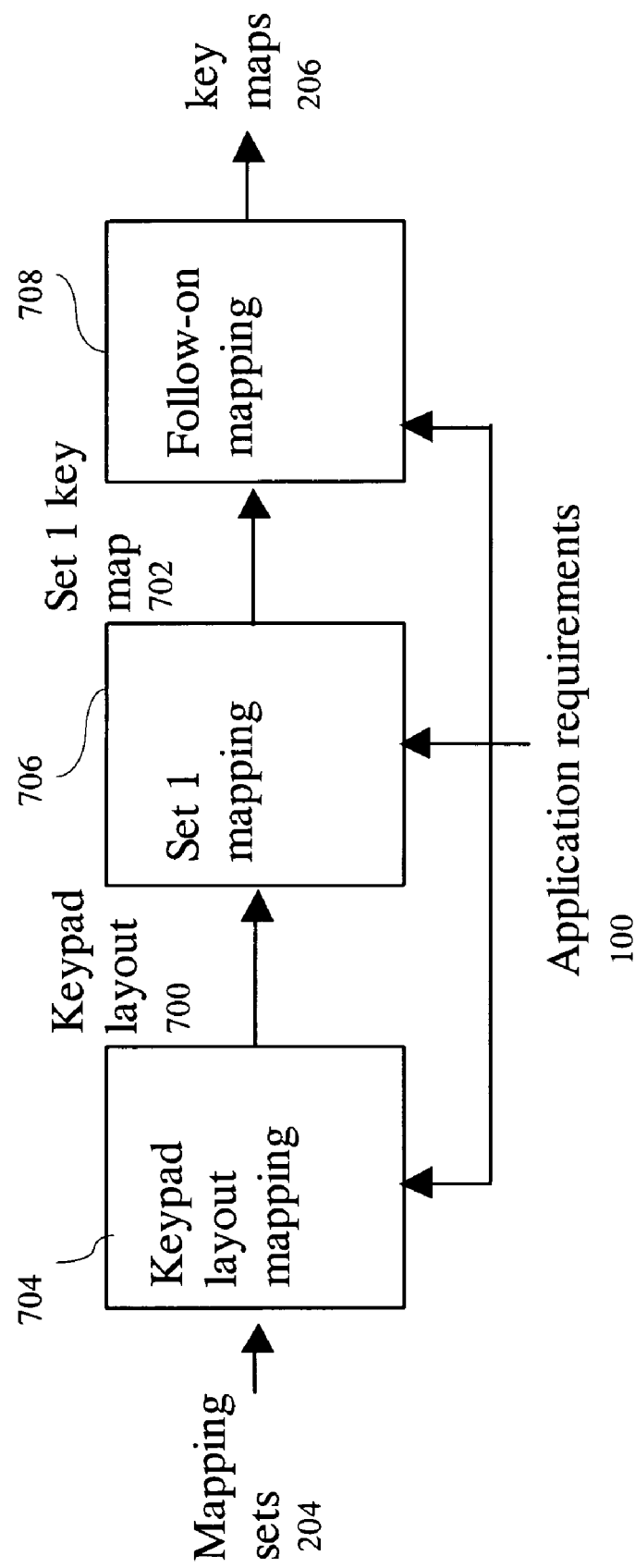
FIG. 7 shows the processing flow for the intra-group location mapping method.

The inter-group mapping determines the mapping sets. The intra-group location mapping determines the button assignments within each set. The mapping is an optimization among many requirements. The intra-group location mapping processing flow is shown in FIG. 7. Given the mapping sets 204 and application requirements 100, a keypad layout mapping step 704 determines the keypad layout 700 containing the number of rows and the number of columns in a keypad and their locations in a handheld device. After keypad layout 700 is determined, a set 1 mapping step 706 maps the keys for set 1 symbols using the keypad layout 700 and application requirements 100. This results in a set 1 key map 702. The follow-on mapping step 708 uses the set 1 key map 702 and application requirements 100 to map the other sets to generate the key maps 206.

A. Keypad Layout

For a set 1 symbol count m, the keypad layout step determines the best r, c and e such that m=rc+e for button matrix keypad layout. Where r is the number of rows and c is the number of columns and e is the extra keys.

Handheld devices and their keypads should be small. It is therefore important to choose the best r, c and e to fit in the handy keypads. In one embodiment of the invention, the r and c design rules are:

(1) For single hand manipulation purpose, the handy keypad dimension is around 62 mm×55 mm or less. In such case, the most compact dimensions are from 4×3+e up to 8×5+e.

(2) For two-hand manipulation, the handheld device can be larger, usually up to around 55 mm×82 mm. In this case, the best matrix dimension can be from 3×10+e up to 7×11+e.

(3) When the number of columns of a keypad is an odd number, then the center area is the best area for single-hand fingertip typing. Therefore, X×3+e, X×5+e, X×7+e are preferred for such ergonomic keypad design. Dimension X×3+e keypad is good for very slim device; X×5+e is good for moderate size and effective entry device; and X×7+e is good for very efficient entry device.

In one embodiment of the invention, to support both English and Chinese language inputs, 26 keys are enough to derive collision-free keypad. Therefore, for most cases, matrix dimensions 3×8+e, 4×6+e, 5×5+e, 6×4+e, 8×3+e, are enough to design a collision-free keypad for both English and Chinese language inputs.

Figure 8A:
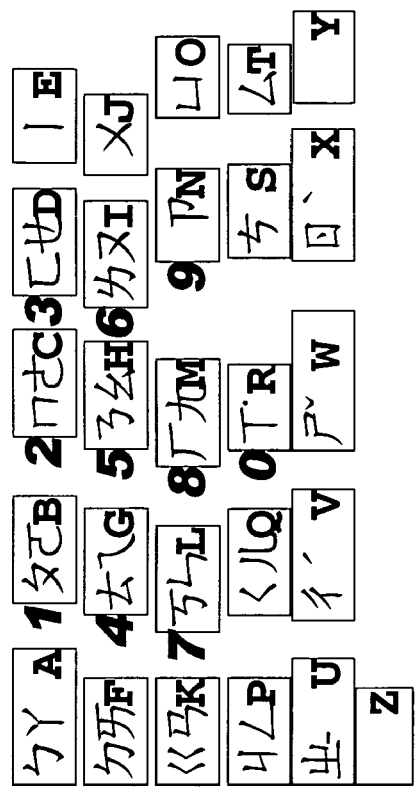
FIG. 8A shows a collision-free keypad assignment.
Figure 8B:
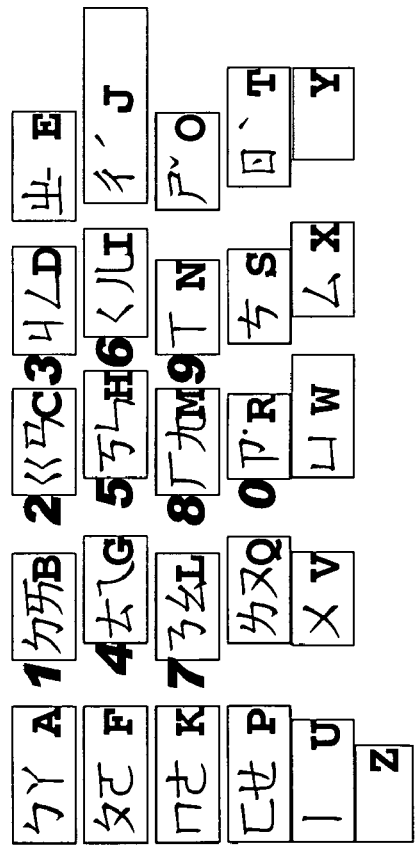
FIG. 8B shows another collision-free keypad assignment.

FIG. 8 shows examples of collision-free 26=5×5+1 keypad layouts for both English and Chinese language inputs. As shown in FIG. 8, the mapping from English letters to the key buttons is a 1-to-1 mapping, and hence, this keypad is a collision-free keypad for English language entry.

For Chinese language entry, each key button is assigned with either 1 or 2 phonetic letters. With this Chinese phonetic letters to key buttons mapping, each Chinese phonetic letter can be selected to complete the language entry, i.e., this keypad is collision-free in Chinese phonetic entry. To illustrate the usage, denote by [r,c] the key button of row r and column c. For example, [2,3] stands for the button of row 2 and column 3, i.e., the button associated with digit 5 in the above keypad. Then each sequence of key strikes yields to a unique Chinese phonetic entry combination as shown below:

(a) [1,1] [1,1] [3,5]→ㄅㄚ

(b) [1,1] [1,2] [2,5]→ㄅㄞˊ

(c) [1,1] [5,1] [3,2][3,5]→ㄅㄧㄠˇ

Figure 9:
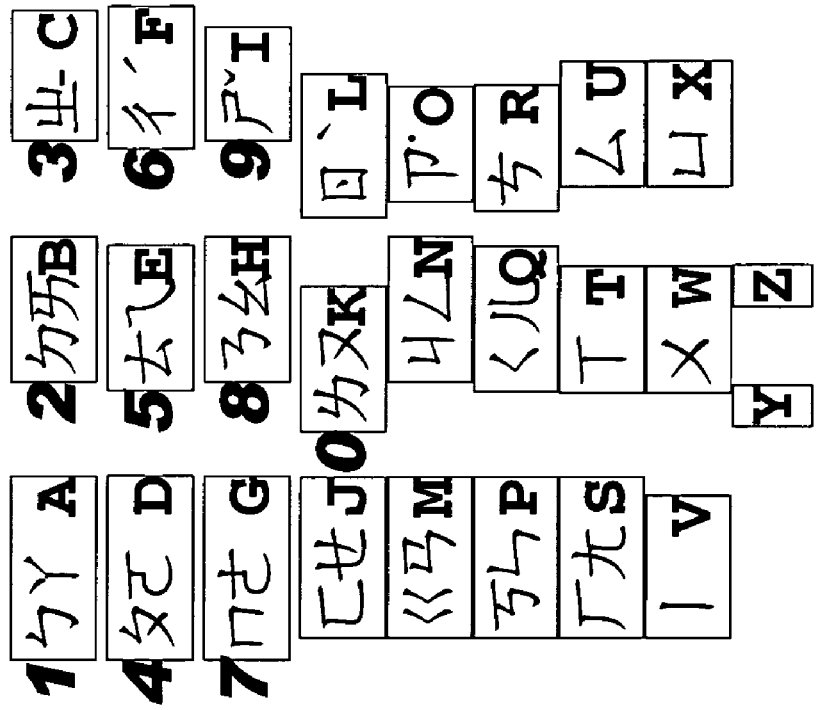
FIG. 9 shows an example of collision-free 26=8×3+1 keypad layout for both English and Chinese language inputs.

FIG. 9 shows an example of collision-free 26=8×3+2 keypad layout for both English and Chinese language inputs.

In addition to the data keys, additional function keys are required for control/input/editing functions, such as arrow keys ([left], [right], [up] and [down]), [enter], [backspace], [delete], [language], [symbol], [phone on]/[off], [menu], [resume]. In one embodiment of the invention, the dynamic function keys are placed right under the screen, which are dynamically associated to specific functions within each scenario. Note that a [space] key is needed for language entry, which might be treated as a data key, but may be placed together with functions keys.

The keypad layout could include additional consideration such as best button size/shape for stylish design. In one embodiment of the invention, higher usage button is given bigger button size. The boundary buttons can be modified in size to fit the keypad total size limitation, and can be modified in shape to fit the stylish requirement. Also, the key shape depends on the fashion that is evolving over time.

B. Set 1 Mapping

The Set 1 mapping method maps the symbols of set 1 to key buttons. This results in the set 1 key map. The mapping should allow the best finger tip manipulation for easiest to remember (such as alphabetical) sequence. Also, put the best-usage-frequency to the most-convenient-to-type allocation (ergonomic) sequence.

In one embodiment of the invention, the symbols are assigned to buttons/locations according to the following rules:

1. Ergonomic allocation for the best effectiveness: allocate the most frequent usage letter to the best ergonomic location in the keypad, the second frequent usage letter to the second best ergonomic location, etc.
2. Alphabetical sequence for quick start: such as alphabetical orders in English alphabets or Chinese phonetic letters. This is easy to remember and quick to find the letters in the keypad.
3. Existing practice order for the least learning cost: such as qwaz-pad's letter-button allocation that has been popularly used.

C. Follow-On Mapping

After set 1 symbols are mapped. The follow-on mapping method continues to map the other sets. The follow-on mapping is implemented as an optimization process. It optimally maps the symbols from set 2 to set 1 symbols in the set 1 key map.

In one embodiment of the invention, a constrained optimization method is used for the mapping. In the preferred embodiment of the invention, a minimum cost method is used.

The method finds the mapping that minimizes a cost function. In the preferred embodiment of the invention, the optimization for the mapping between Set 1 and Set 2 is listed as follows:

$$\text{MIN } \Sigma\{BC(m(i))*w(i)+\text{Application\_Constraint}(m(i))\} \forall m(\text{Set2, Set1}) i \in \text{Set1}$$

Where m(Set2, Set1) is a mapping function between Set 2 and Set 1; BC is the button-collision frequency for the mapping of m(i) in Set 2 to symbol i in Set 1; w(i) is a weighting factor for symbol i corresponding to the importance of i. The optimization process could be directly generalized to include the mapping of more than two sets. The cost function for optimization is defined as the sum of button-collision, BC, of all key assignments plus an application constraint term. Mapping without constraint can be performed by removing the application constraint from the cost function. The application constraints include existing practice key mapping order or ergonomic constraint or design constraints. The mappings violate the application constraints are penalized by increasing of the cost through the application constraint.

In another embodiment of the invention, the optimization could be performed by the minimum of maximum operation as follows:

$$\text{MIN Max}\{BC(m(i))*w(i)+\text{Application\_Constraint}(m(i))\} \forall m(\text{Set2, Set1}) i \in \text{Set1}$$

The button-collision is language dependent. Given a language, the usage frequencies of its letters can be determined. Given a keypad with given letters to button mapping, the button-collision of a given button is the sum of the frequencies of all letters except the first letter assigned to this button.

For example, in the 10-key Phone Pad with traditional multiple English letter mapping, button [9] is mapped with letters W, X, Y and Z. Its button-collision is f(X)+f(Y)+f(Z) where f(X) is the frequency for letter X.

In Chinese phonetic entry, letters assigned to the same button is still defined as collision free if the phonetic entry order can automatically select the right letters. For examples, let [ㄅ,ㄚ], [ㄉ,ㄖ] and [ㄍ,ㄍ] be three buttons each with two Chinese phonetic letters, then these three buttons are all collision-free, because Chinese phonetic entry can automatically distinguish and select right letters.

If a letter is collided with just one letter, then the collision is less than that of colliding with two or more letters. Therefore, the optimization method will be in favor of mapping with the least number of letters. The least usage letters can be assigned to center ergonomically convenient locations buttons for easy typing, or assigned to boundary buttons for less confusion. For either case, the keypad collisions are the same. But they could be mapped using the weighting factor or the application constraints.

In Chinese language, phonetic letters ㄧ, ㄨ and ㄩ are among the least used letters. Therefore, 21 keys are enough for a very small collision keypad.

In English language, Q, W, X, Y and Z are among least used letters, and 21 keys are enough to derive a very small collision keypad. The followings are very small collision Keypads derived from the optimization method for both Chinese and English language entry.

Figure 10B:
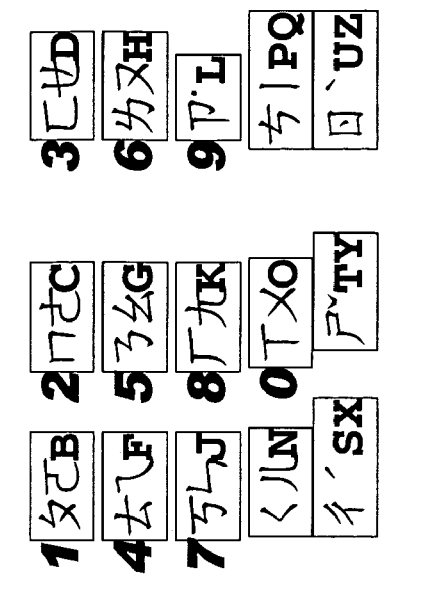
FIG. 10B shows an example of 21=5×4+1 Keypad assignment.
Figure 10A:
FIG. 10A shows an example of 21=7×3 Keypad assignment.
Figure 10C:
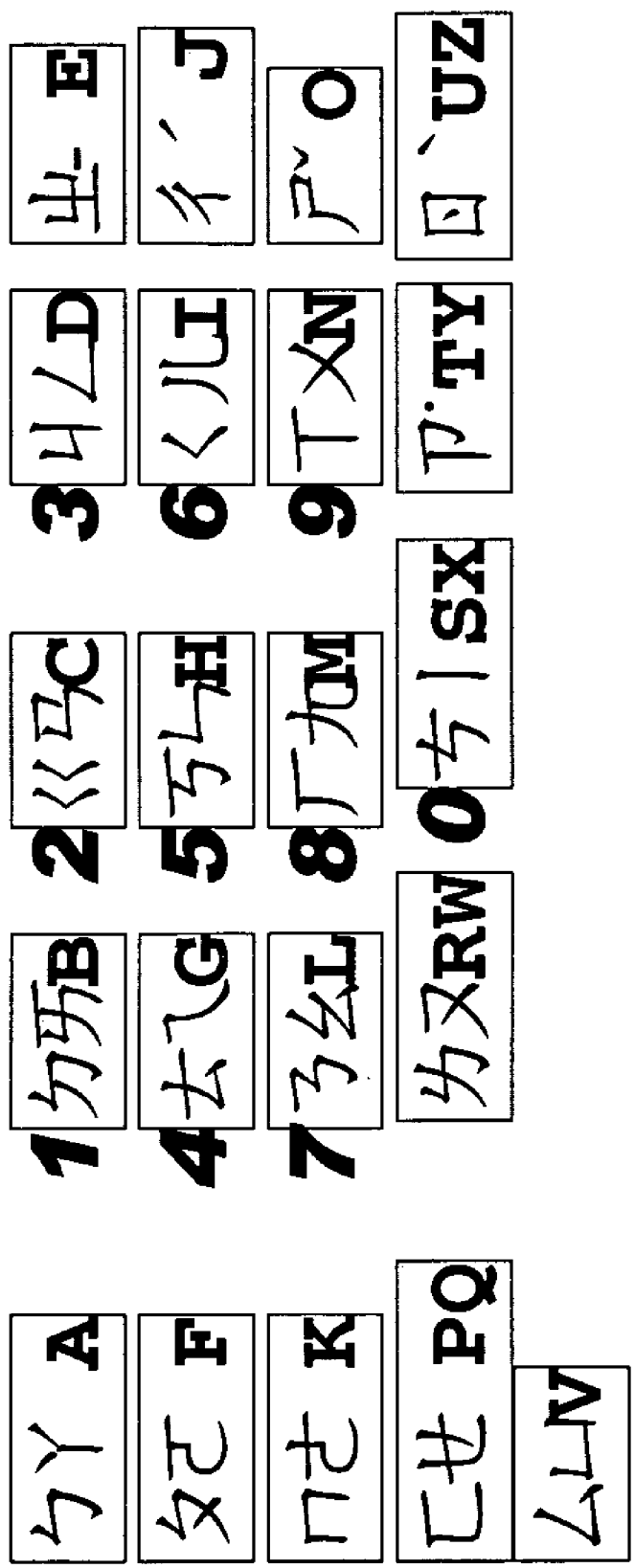
FIG. 10C shows an example of 21=4×5+1 Keypad assignment.

The small-collision 21-key keypad can be arranged into 21=7×3, 21=3×7, 21=4×5+1 or 21=5×4+1. FIG. 10A, FIG. 10B and FIG. 10C are three examples:

III. Versatile Keypad Interactive Optimization

Figure 11:
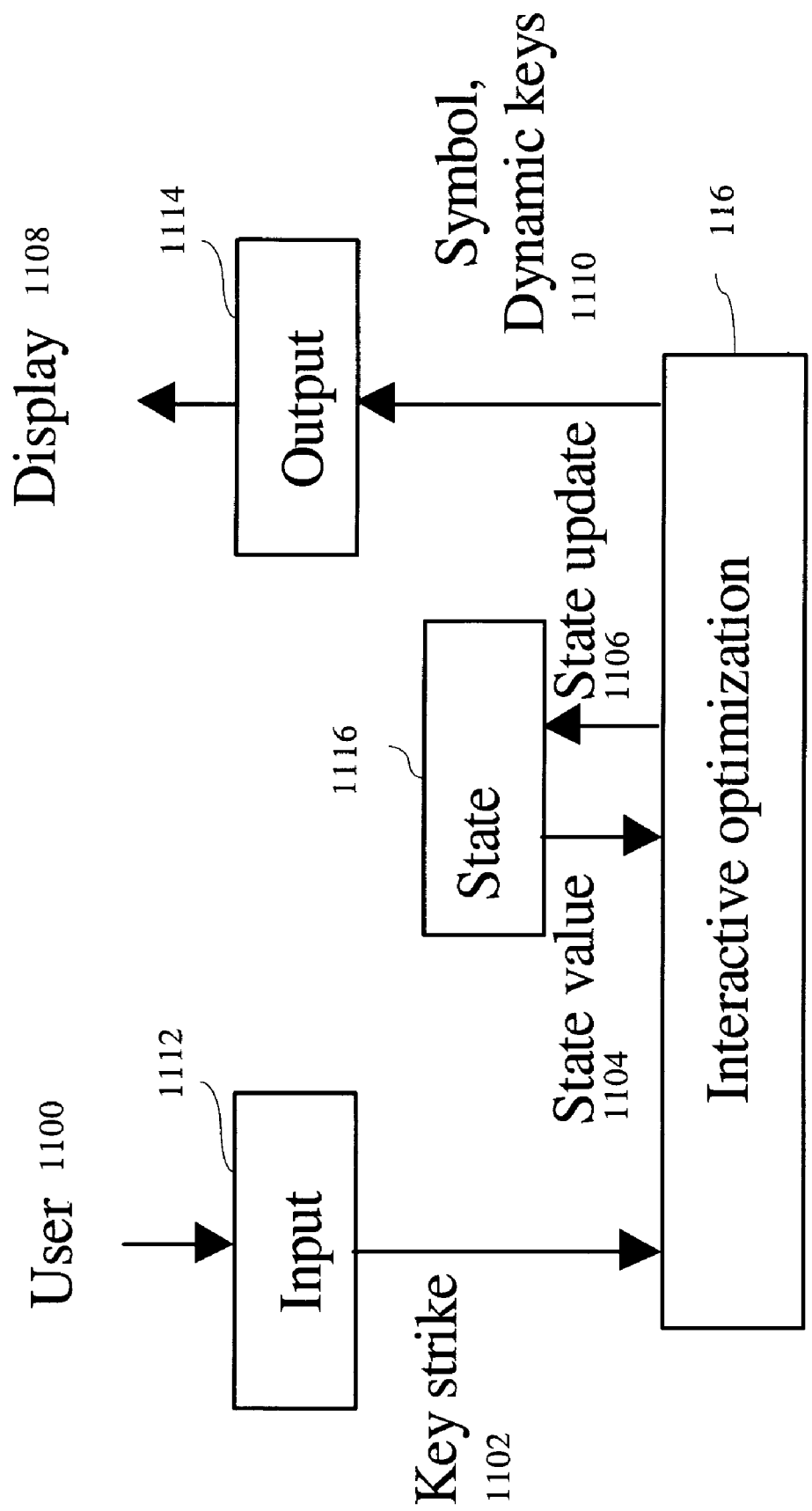
FIG. 11 shows the processing flow for the versatile keypad and interactive optimization method.

The versatile keypad map generated from the application mapping is implemented in a versatile keypad either by pre-manufactured hard keys or by soft keys or a combination of hard and soft keys. The versatile keypad can be optimized during the online operation (not just offline design stage) through a keypad interactive optimization method. As shown in FIG. 11, the versatile keypad consists of an input unit 1112, an output unit 1114 and a state unit 1116. The input unit 1112 could be hard keypad or touch screen display with soft keys. The output unit 1114 consists of the display 1108 of the handheld device. The state unit 1116 maintains the current state of the input or output. In operation, the state value 1104 is initialized to the initial input state. After user 1100 strikes a key, the key strike 1102 and the state value 1104 (together as the received data) are sent to the interactive optimization module 116. The interactive optimization module 116 processes these inputs 1102, 1104 and returns online action data include the symbol(s) and/or dynamic keys (for soft keys) 1110 that should be displayed for the key strike 1102. It also outputs a state update 1106 that will be used to update the state value maintained in the state unit 1116.

In the Chinese language example, if the ⌗ key is striked. Both ⌗ and ⌗ will be displayed since both of them could be the intended symbol input. In the case of soft key, it may display the next set of keys according to the key strike. The state is now updated to "ready for second key strike" state. When the second key strike is entered, the interactive optimization module receives the key strike and the state. It then determines the proper information for display. In the Chinese language example, if the second strike is the - key, then the display will be determined by the interactive optimization unit as ⌗⌗. . . for user selection since the key intention is resolved. On the other hand, if the second strike is the 日 key, then the display will be determined by the interactive optimization unit as ⌗日 and the state is in the "continue input" state. This process continues until the user input is efficiently completed controlled by the interactive optimization method.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A keypad optimization method for handheld devices with optimal multi-language entry capability and handiness for both handheld and fingertip manipulation comprising the steps of:
   a) input application requirements containing language specification;
   b) perform application mapping using the application requirements having versatile keypad map output wherein the application mapping method consists of the following steps:
      1) perform language entry order grouping using the language specification having entry order groups and valid combination output;
      2) perform inter-group mapping using the application requirements and the entry order groups and valid combination having mapping sets output;
      3) perform intra-group location mapping using the application requirements and the mapping sets having key maps output;
   c) implement a versatile keypad using versatile keypad map wherein the versatile keypad receives user input and generates received data output;
   d) perform interactive optimization using the received data having online action output;
   e) generate keypad output and screen display by the versatile keypad using the online action.

2. The application mapping method of claim 1 wherein the language entry order grouping method performs early entry symbol first method.

3. The application mapping method of claim 1 wherein the language entry order grouping partitions Chinese phonetic symbols into 4 groups according to the entry order.

4. The application mapping method of claim 1 wherein the inter-group mapping method consists of a collision-free mapping and a least-collision mapping.

5. The application mapping method of claim 1 wherein the intra-group location mapping method consists of the following steps:
   a) perform keypad layout mapping using the mapping sets and the application requirements having keypad layout output;
   b) perform Set 1 mapping using the application requirements and the keypad layout having set 1 keypad map output;
   c) perform follow-on mapping using the application requirements and the set 1 keypad map having key maps output.

6. The follow-on mapping method of claim 5 finds the mapping that minimizes a cost function.

7. An application mapping method for keypad optimization of handheld devices with optimal multi-language entry capability comprising the steps of:
   a) input application requirements containing language specification;
   b) perform language entry order grouping using the language specification having entry order groups and valid combination output;
   c) perform inter-group mapping using the application requirements and the entry order groups and valid combination having mapping sets output;
   d) perform intra-group location mapping using the application requirements and the mapping sets having key maps output wherein the intra-group location mapping method consists of the following steps:
      1) perform keypad layout mapping using the mapping sets and the application requirements having keypad layout output;
      2) perform Set 1 mapping using the application requirements and the keypad layout having set 1 keypad map output;
      3) perform follow-on mapping using the application requirements and the set 1 keypad map having key maps output.

8. The follow-on mapping method of claim 7 wherein the keypad layout mapping method includes additional consideration such as best button size or shape for stylish design.

9. The follow-on mapping method of claim 7 finds the mapping that minimizes a cost function.

* * * * *